(12) United States Patent
Wang et al.

(10) Patent No.: US 11,546,376 B2
(45) Date of Patent: Jan. 3, 2023

(54) SYSTEMS AND METHODS FOR SECURING USER DOMAIN CREDENTIALS FROM PHISHING ATTACKS

(71) Applicant: Citrix Systems, Inc., Ft. Lauderdale, FL (US)

(72) Inventors: Yiming Wang, Nanjing (CN); Sai Xu, Nanjing (CN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 219 days.

(21) Appl. No.: 16/686,888

(22) Filed: Nov. 18, 2019

(65) Prior Publication Data
US 2021/0092155 A1 Mar. 25, 2021

Related U.S. Application Data

(63) Continuation of application No. PCT/CN2019/107676, filed on Sep. 25, 2019.

(51) Int. Cl.
*H04L 29/06* (2006.01)
*H04L 9/40* (2022.01)

(52) U.S. Cl.
CPC ........ *H04L 63/1483* (2013.01); *H04L 63/083* (2013.01); *H04L 63/20* (2013.01)

(58) Field of Classification Search
CPC .. H04L 63/21483; H04L 63/083; H04L 63/20
See application file for complete search history.

(56) References Cited

U.S. PATENT DOCUMENTS

| 8,220,047 B1 * | 7/2012 | Soghoian | H04L 51/214 709/227 |
|---|---|---|---|
| 9,736,147 B1 | 8/2017 | Mead | |
| 2007/0006305 A1 * | 1/2007 | Florencio | H04L 63/1483 726/22 |
| 2007/0199054 A1 | 8/2007 | Florencio et al. | |

(Continued)

FOREIGN PATENT DOCUMENTS

EP 2348442 7/2011

OTHER PUBLICATIONS

"How to check the security state of an XMLHTTPRequest over SSL", downloaded from https://developer.mozilla.org/en-US/docs/Web/API/XMLHttpRequest/How_to_check_the_secruity_state_of_an_XMLHTTPRequest_over_SSL, downloaded Nov. 15, 2019, 9 pages.

(Continued)

*Primary Examiner* — Wasika Nipa
(74) *Attorney, Agent, or Firm* — Finch & Maloney PLLC

(57) ABSTRACT

A computer system is provided. The computer system includes a memory and at least one processor coupled to the memory and configured to recognize a user input field of a web site displayable in a browser, the website identified as a security risk based on a whitelist of website addresses; determine that a sequence of characters within the user input field matches one or more entries in a list of partial passwords in response to the web site being identified as a security risk; and prevent the user from entering additional characters into the user input field in response to the determination, to block receipt of the password by the web site. The determination may be performed in response to a count of characters in the sequence of characters exceeding a threshold.

21 Claims, 8 Drawing Sheets

(56) References Cited

U.S. PATENT DOCUMENTS

| | | | |
|---|---|---|---|
| 2008/0098464 A1 | 4/2008 | Mizrah | |
| 2009/0063462 A1* | 3/2009 | Alfonseca | G06F 40/232 |
| | | | 707/999.005 |
| 2016/0253492 A1* | 9/2016 | Chougle | G06F 21/31 |
| | | | 726/5 |
| 2019/0173921 A1 | 6/2019 | Dicorpo et al. | |

OTHER PUBLICATIONS

International Search Report dated Jun. 23, 2020 for International Patent Application No. PCT/CN2019/107676, 4 pages.

Written Opinion dated Jun. 23, 2020 for International Patent Application No. PCT/CN2019/107676, 4 pages.

International Search Report and Written Submission dated Mar. 25, 2022 for International Application No. PCT/US2021/064914 (9 pages).

International Preliminary Report on Patentability dated Jan. 26, 2022 for International Application No. PCT/CN2019/107676 (16 pages).

\* cited by examiner

| # SYSTEMS AND METHODS FOR SECURING USER DOMAIN CREDENTIALS FROM PHISHING ATTACKS

RELATED APPLICATIONS

This application claims the benefit under 35 U.S.C. § 120 as a continuation of PCT application no. PCT/CN2019/107676 titled SYSTEMS AND METHODS FOR SECURING USER DOMAIN CREDENTIALS FROM PHISHING ATTACKS, filed on Sep. 25, 2019, which designates the United States. The content of the aforementioned application is hereby incorporated herein by reference in its entirety.

BACKGROUND

Cyber security is an issue of great importance, as attacks on computer systems and the users of those systems continue to increase. One of the most prevalent, and often most successful, forms of attack is known as the "phishing attack," in which the user is tricked into willingly providing credentials, such as login passwords, to a bad actor or hacker. This can occur under various scenarios. For example, the user may be directed to the hacker's web site which is disguised as a legitimate web site, and which asks the user to login using his credentials. Another example is where the user visits a legitimate web site that has been hacked (perhaps unknown to the owner of the web site) to include software that intercepts the user's credentials during a login process and surreptitiously forwards those credentials to the hacker. Many other examples are possible.

SUMMARY

In at least one example, a computer system is provided. The computer system includes a memory; and at least one processor coupled to the memory and configured to: recognize a user input field of a web site displayable in a browser, the website identified as a security risk based on a whitelist of website addresses; determine that a sequence of characters within the user input field matches one or more entries in a list of partial passwords in response to the web site being identified as a security risk; and prevent the user from entering additional characters into the user input field in response to the determination, to block receipt of the password by the web site.

At least some examples of the computer system can include one or more of the following features. The at least one processor can be configured to perform the determination in response to a count of characters in the sequence of characters exceeding a threshold. In the computer system, the web site is displayable in a first security context, and the at least one processor can be configured to: obtain a credential of the user in a second security context, the second security context separate from the first security context such that the second security context prevents receipt of user input by the web site; authenticate the user credential with a rule server; obtain the whitelist of web site addresses from the rule server in response to the authentication; and obtain the list of partial passwords from the rule server in response to the authentication, wherein the one or more entries in the list of partial passwords are encrypted. The at least one processor can be configured to perform the determination by encrypting the sequence of characters; and comparing the encrypted sequence of characters to the one or more encrypted entries in the list of partial passwords to find a match. The at least one processor can be configured to provide a warning to the user in response to the determination. In the computer system, the web site addresses are uniform resource locators. In the computer system, the partial password is a sub-string of the user credential that excludes one or more characters. The at least one processor can be configured to delete characters within the user input field in response to the determination.

In at least one example, a method of securing user credentials is provided. The method includes recognizing, by a computer system, a user input field of a web site displayable in a browser, the website identified as a security risk based on a whitelist of website addresses; determining, by the computer system, that a sequence of characters within the user input field matches one or more entries in a list of partial passwords in response to the web site being identified as a security risk; and preventing, by the computer system, the user from entering additional characters into the user input field in response to the determination, to block receipt of the password by the web site.

At least some examples of the method can include one or more of the following features. The act of performing the determination in response to a count of characters in the sequence of characters exceeding a threshold. The acts of, wherein the web site is displayable in a first security context, obtaining a credential of the user in a second security context, the second security context separate from the first security context such that the second security context prevents receipt of user input by the web site; authenticating the user credential with a rule server; obtaining the whitelist of web site addresses from the rule server in response to the authentication; and obtaining the list of partial passwords from the rule server in response to the authentication, wherein the one or more entries in the list of partial passwords are encrypted. The act of performing the determination by encrypting the sequence of characters; and comparing the encrypted sequence of characters to the one or more encrypted entries in the list of partial passwords to find a match. The act of providing a warning to the user in response to the determination. The method is executed by a plug-in associated with the web browser. The web site addresses are uniform resource locators. The partial password is a sub-string of the user credential that excludes one or more characters.

In at least one example, a non-transitory computer readable medium storing executable sequences of instructions to secure user credentials, is provided. The sequences of instructions include instructions to: recognize a user input field of a web site displayable in a browser, the website identified as a security risk based on a whitelist of website addresses; determine that a sequence of characters within the user input field matches one or more entries in a list of partial passwords in response to the web site being identified as a security risk; and prevent the user from entering additional characters into the user input field in response to the determination, to block receipt of the password by the web site.

At least some examples of the non-transitory computer readable medium can include one or more of the following features. Instructions to perform the determination in response to a count of characters in the sequence of characters exceeding a threshold. Instructions to: obtain a credential of the user in a second security context, the second security context separate from the first security context such that the second security context prevents receipt of user input by the web site; authenticate the user credential with a rule server; obtain the whitelist of web site addresses from the rule server in response to the authentication; and obtain the list of partial passwords from the rule server in response to the authentication, wherein the one or more entries in the list of partial passwords are encrypted. Instructions to: encrypt the sequence of characters; and compare the encrypted sequence of characters to the one or more encrypted entries in the list of partial passwords to find a match. Instructions to provide a warning to the user in response to the determination. The instructions are included in a plug-in associated with the web browser. The web site addresses are uniform resource locators. The partial password is a sub-string of the user credential that excludes one or more characters. Instructions to delete characters within the user input field in response to the determination.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
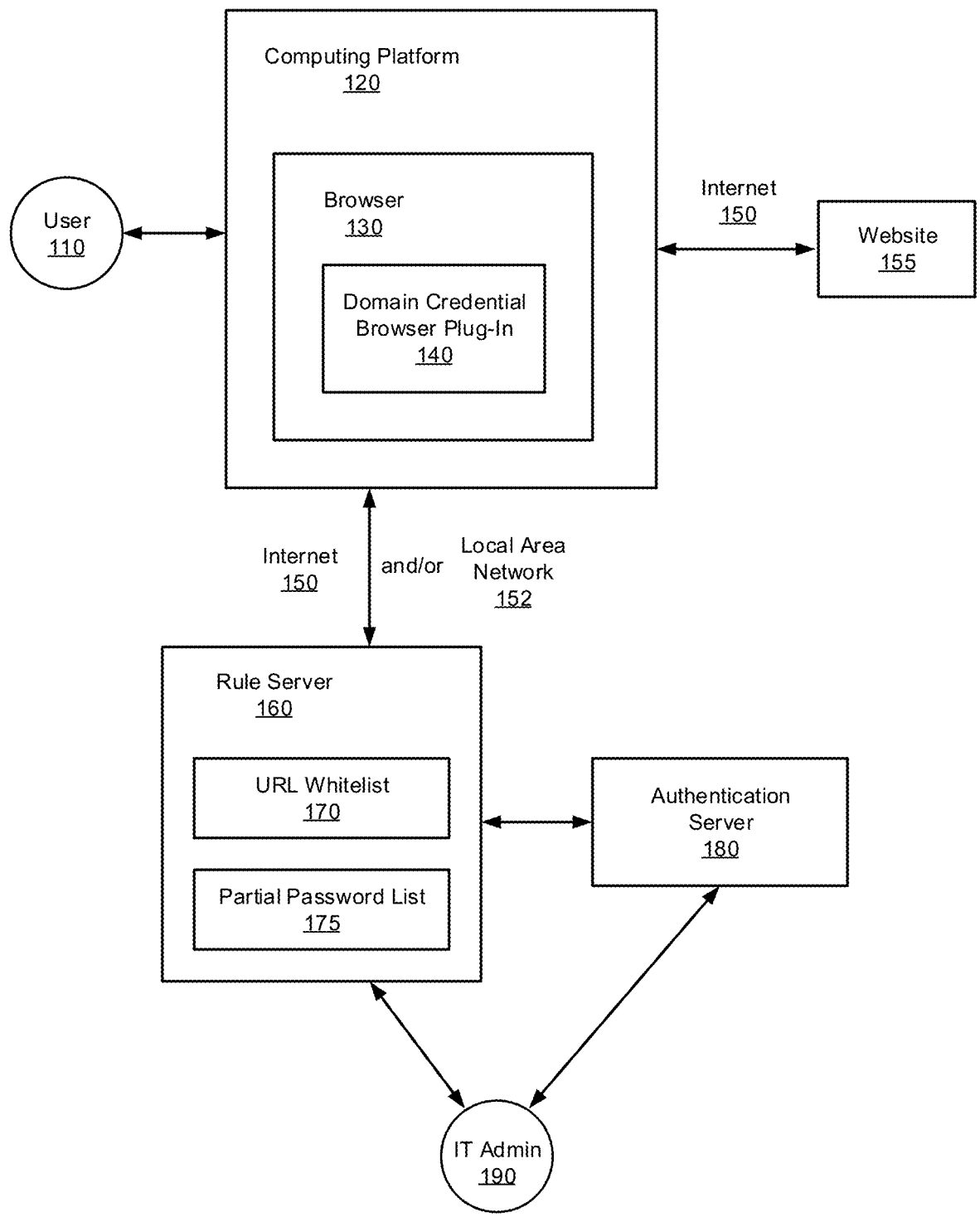
FIG. 1 is a block diagram of a system employing a domain credential browser plug-in, configured in accordance with an example of the present disclosure.

As noted previously, cyber security is a growing concern as attacks on computer systems and the users of those systems increase. Phishing attacks, in particular, pose a serious problem. In a phishing attack, the user may visit a website that is believed to be legitimate and is fooled into entering his credentials (e.g., a domain password) on an input form of the website. It can often be difficult or impossible for the user to recognize a nefarious or compromised website, and so urging users to be diligent is generally not an effective solution to this problem. Likewise, maintaining a blacklist of web sites that are known to be dangerous is not effective, as such a list would require constant updates and can never be complete.

User domain credentials typically include a username and password that the user enters to login to his or her computer. Additionally, once logged in, these credentials often allow the user to access other resources, particularly in corporate environments, such as email servers, files on shared/networked disk drive storage, and printers, to name just a few. As such, user domain credentials are an attractive target for phishing attacks.

To address this problem, and as summarized above, various examples described herein are directed to systems and methods for securing user domain credentials from detection by a phishing attack. In some examples, the disclosed techniques are implemented by a plug-in to the web browser.

In some examples, the disclosed techniques prevent a user from providing a user domain password to a non-approved (e.g., non-whitelisted) web site by checking each character of the sequence of characters that are entered by the user into a password field of that website, and verifying that the sequence of characters does not match a list of partial passwords. Partial passwords are subsets of the user domain password and may include any selectable grouping or sub-combination of portions of the password. According to one example, if the user has an N character user domain password, and the user types in the first K characters of that password (where K is a selectable threshold value), the system may block the user from entering any additional characters and provide a warning to the user of a potential security issue. Thus, a compromised or malicious web site will be prevented from obtaining the full password.

These systems and methods overcome a number of security problems. For example, because it can be difficult for users to remember large numbers of passwords, users often employ the same password (e.g., their user domain password), or a close variation, as the password to gain access to other websites. The disclosed techniques will prevent this behavior, unless those websites are whitelisted, for example by a system administrator.

As another example, a user may navigate to a website that has been compromised in some manner, unknown to the user, and the compromised website may generate a pop-up window asking the user to enter their user domain credentials. The pop-up window may provide a plausible reason for this request and appear to be legitimate. The disclosed techniques will once again prevent the user from entering these credentials.

As yet another example, a user may attempt to navigate to a legitimate website, but get redirected to a phishing website that closely resembles the legitimate website. Here again, the phishing website may generate a pop-up window asking the user to enter their user domain credentials in a compellingly plausible matter, and the disclosed techniques will prevent the user from doing so.

Thus, and in accordance with at least some examples disclosed herein, systems and methods for securing user domain credentials from detection by a phishing attack are provided. These systems and methods provide for detection and blocking of attempts by a user to enter more than a portion of their user domain password to a non-whitelisted web site. The extent of that portion can be a configurable parameter of the system and may be set by a system administrator or other trusted authority.

As will be understood in view of this disclosure, the systems and methods for securing user domain credentials from detection by a phishing attack provided herein have several advantages over methods which rely on user vigilance, which is subject to lapse, or blacklisted web sites, which require constant updates and can never be complete. For instance, the systems and methods described herein provide automated protection and do not rely on user action.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Domain Credential Browser Plug-in

In some examples, a system employing a domain credential browser plug-in is configured to secure user domain credentials from phishing attacks. FIG. 1 is a block diagram of a system employing a domain credential browser plug-in 140, configured in accordance with an example of the present disclosure. As shown in FIG. 1, a user 110 interacts with the computing platform 120 which includes an executable web browser 130. A domain credential browser plug-in 140 is incorporated in the browser 130, to provide user domain credential security against phishing attacks, as will be explained in greater detail below. The computing platform 120 is also shown to be connected to the Internet 150, through which the user can navigate to any desired website 155. In some examples, a website can represent a computing resource or resource of any type that can be accessed through a web browser.

Also shown, are a rule server 160 and an authentication server 180, connected to the computing platform by the Internet 150 and/or a local area network 152. The rule server 160 and the authentication server 180 are typically trusted entities. IT administrative personnel 190 are shown to have control over the rule server 160 and authentication server 180. The rule server 160 is configured to store the URL whitelist 170 and the list of partial passwords 175, which in some examples may be stored in encrypted form. A separate list of partial passwords may be maintained for each potential user of the system, since each user will typically have a unique user domain password.

In some examples, the user 110 may be required to authenticate themselves prior to accessing the URL whitelist 170 and partial password list 175. This may be accomplished, for example, with a token that is provided to the rule server 160 and subsequently authenticated by authentication server 180, as will be described in greater detail below.

In some examples, the user may access a browser through a workspace, as in, for example, a virtual application/desktop scenario or other type of remote login scenario. In this example, the web browser 130 is executing in the workspace as opposed to the user's computer platform 120, but the disclosed techniques may still be applied, with some modification, as will be explained in greater detail below.

Figure 2:
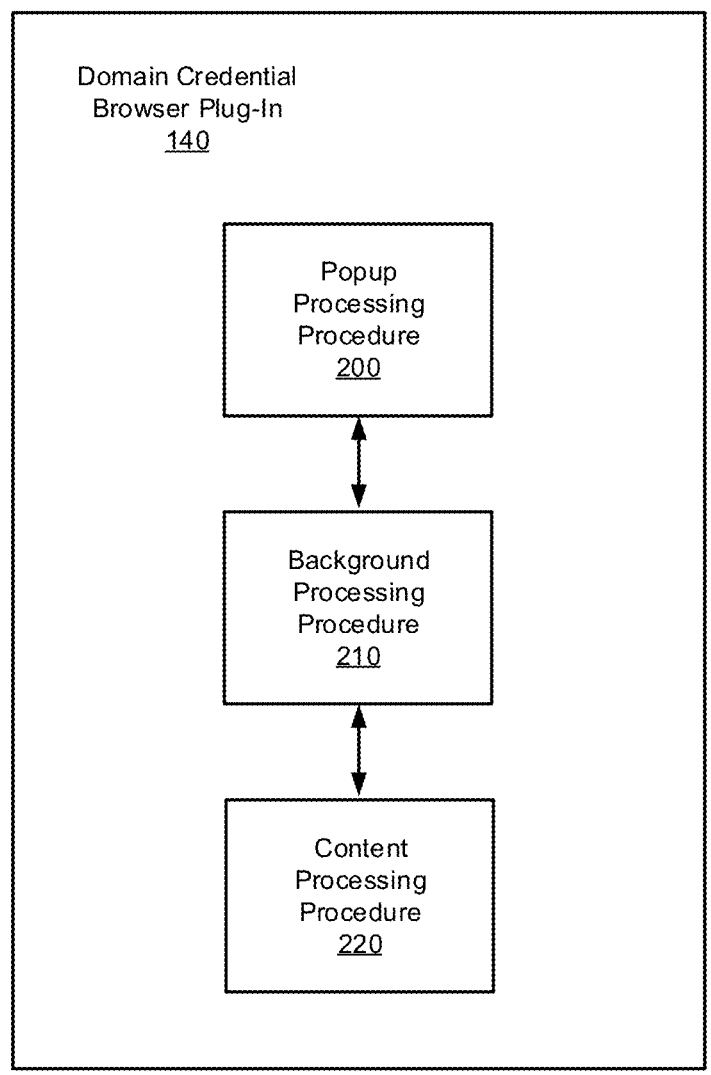
FIG. 2 is a block diagram of the domain credential browser plug-in, configured in accordance with an example of the present disclosure.

FIG. 2 illustrates a logical architecture of a domain credential browser plug-in 140 in accordance with an example of the present disclosure. As shown in FIG. 2, the browser plug-in 140 includes a pop-up processing procedure 200, a background processing procedure 210, and a content processing procedure 220. These procedures are typically implemented in software, although other implementations are possible in some cases.

The pop-up processing procedure 200 is configured to interact with the user, for example through a pop-up login form prompting the user to login provided by the procedure 200. The pop-up processing procedure 200 executes in a safe security context (referred to herein simply as context), separate from the context of the web site page. In some examples, the pop-up processing procedure 200 is implemented in hypertext markup language (HTML).

The background processing procedure 210 is configured to monitor browser events and respond to them by executing specified instructions, for example to interact with one or more of the pop-up processing procedure 200, the content processing procedure 220, and the rule server 160. The background processing procedure 210 executes in another safe context, separate from the context of the web site page. In some embodiments, the background processing procedure 210 is implemented as JavaScript.

The content processing procedure 220 is configured to interact with the web pages that the browser visits and pass information between the web site and the other browser plug-in procedures. For example, the content processing procedure 220 monitors character sequences that are entered by the user into forms or input fields of the web page and can determine that the user is entering a password if the input field is tagged with "type=password." The content processing procedure 220 executes in the context of the web page, and is therefore not secured, unlike the pop-up processing procedure 200 and the background processing procedure 210 which are secured. For this reason, characters entered by the user into forms or input fields which are handled by the content processing procedure 220 are also visible to the web site and therefore subject to compromise. In some embodiments, the content processing procedure 220 is implemented as JavaScript.

The operations and interactions of each of these procedures will be described in greater detail below.

Domain Credential Protection Process

Figure 3:
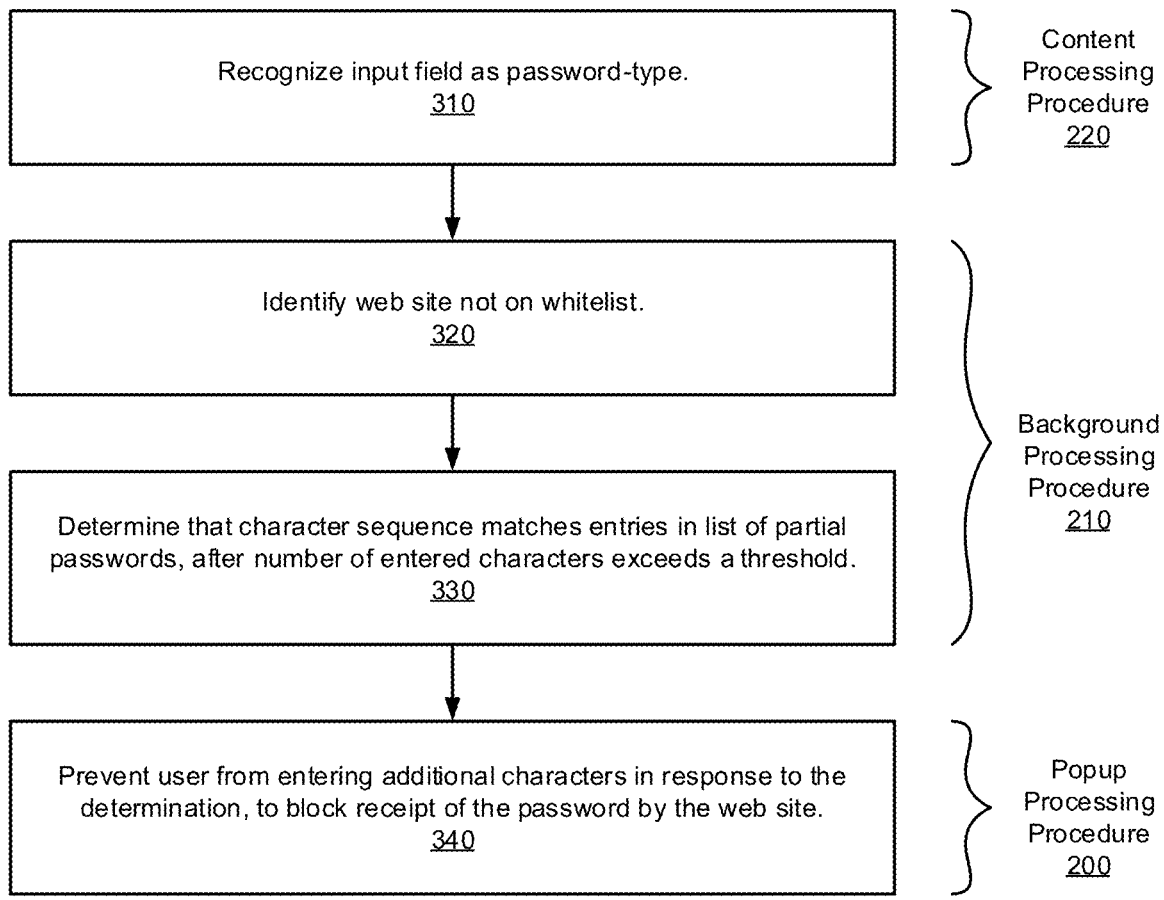
FIG. 3 is a flow diagram of a process for securing user domain credentials from phishing attacks, in accordance with an example of the present disclosure.

As described above, some examples of the system 100 of FIG. 1 are configured to execute processes for securing user domain credentials from phishing attacks. The processes may be executed on a processor of any suitable type (e.g., processor 803 of FIG. 8). The processes may further be implemented through execution of a web browser plug-in. FIG. 3 is a flow diagram of a process for securing user domain credentials, in accordance with an example of the present disclosure.

The process 300 starts at operation 310 with recognizing a user input field, presented by a web site to which the user has navigated, as a password-type input field. The user input field is presented to the user by the content processing procedure 220 of the web browser plug-in. In some examples, the web site is presented to the user in a first context that is associated with the website and is unsecure since any characters entered into the input field are visible to the web site.

Next, at operation 320, a whitelist of web site addresses is searched to determine if the web site in question (i.e. that the user is browsing) is included on that whitelist. This operation may be performed by the background processing procedure 210. For example, the whitelist includes "safe" or "approved" web site addresses. The whitelist may be compiled by a system administrator or other trusted authority and stored on the rule server 160. The addresses may be in the form of IP addresses, uniform resource locators (URLs), or in any other suitable form.

At operation 330, when the number of characters entered by the user into the user input field exceeds a selected threshold, the sequence of characters is checked, and re-checked, as each additional character is entered, to determine whether the sequence matches one or more entries in a list of partial passwords. The determination is performed if the count of entered characters exceeds the threshold value (e.g., a start-checking-length), and if the web site is not included on the whitelist. This operation may also be performed by the background processing procedure 210.

In some examples, a partial password is a sub-string of the user credential that excludes one or more characters. The number of excluded characters may be set to the difference between the password length and the start-checking-length. For example, if the password is "abcdef" (password length equals 6 characters) and the start-checking-length is 5, then the list of partial passwords is:
"abcde"
"abcdf"
"abcef"
"abdef"
"acdef"
"bcdef"

In some examples, the start-checking-length parameter may be optional. In such case, the user entry into the password field can be checked on every text change event.

In some examples, the list of partial passwords 175 may be generated by the rule server 160, which is a trusted entity, by enumerating all the possible combinations based on knowledge of the user domain password and the selected start-checking-length parameter.

At operation 340, the user is prevented from entering additional characters into the user input field if the determination of a match is successful. For example, a warning may be provided to the user through a pop-up window, the input field may be cleared, and/or the plug-in may block further keystrokes from being accepted. This operation may be performed by the pop-up processing component 220.

In some examples, the user may be limited to a selected number of attempts at entering the password in a given period of time, to prevent guessing and to limit the amount of information is made available to the phishing attack. If the limit is exceeded, the browser may be closed and the token may be cleared from local storage. For additional security, the computer may even be locked (e.g., using a Pepper Plug-in Application Programming Interface (PPAPI) implementation).

In some examples, the entries in the list of partial passwords are encrypted and the process further includes encrypting the sequence of characters entered by the user into the user input field prior to comparing that sequence to the entries in the list of partial passwords.

In some examples, the whitelist and the list of partial passwords are obtained from a rule server. In some examples, the user must be authenticated to the rule server prior to obtaining the white list and the list of partial passwords. The authentication process may include obtaining a credential of the user in a secure context that is separate from the first context such that the web site cannot obtain user input provided in the secure context.

Figure 4:
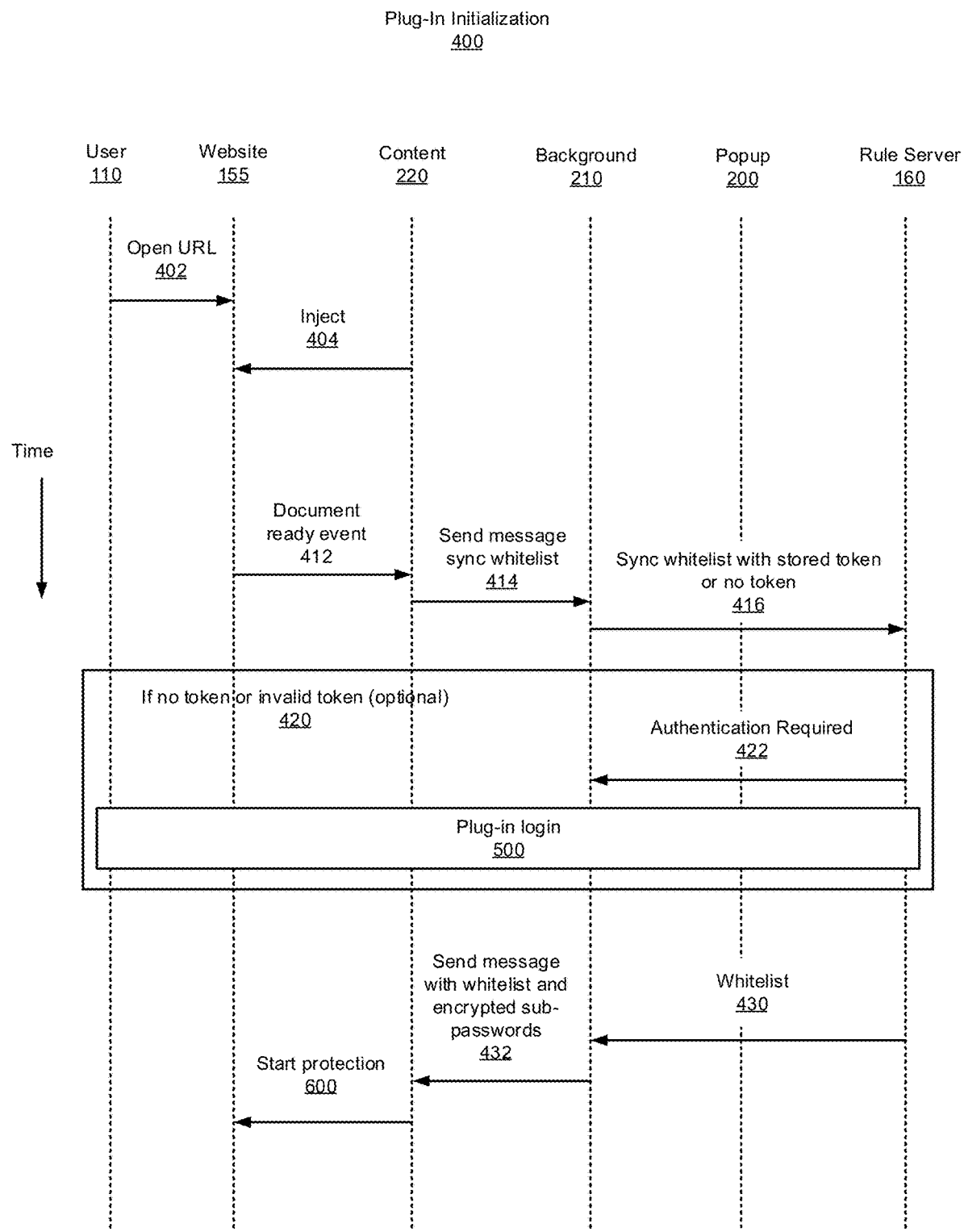
FIG. 4 is a sequence diagram of the browser plug-in initialization process, in accordance with an example of the present disclosure.

FIG. 4 is a sequence diagram of the browser plug-in initialization process 400, in accordance with an example of the present disclosure. The sequence diagram illustrates interactions between entities (user 110, website 155, content processing component 220, background processing component 210, pop-up processing component 200, and rule server 160) in the horizontal direction, over time in the vertical direction.

At operation 402, the user 110 navigates to a website 155 (e.g., to request opening of a web page at a specified URL using the browser 130). At operation 404, the content processing component 220 is injected into the context of the website 155.

The following operations are directed to synchronizing the whitelist and list of partial passwords (also referred to as sub-passwords) with the rule server 160. At operation 412, a document ready event is sent from the website 155 to the content processing component 220 to signal that the web page at the requested URL is open. At operation 414, a "sync whitelist" message is sent from the content processing component 220 to the background processing component 210. At operation 416, the background processing procedure 210 syncs the whitelist with the rule server 160. In some examples, a token is used, to provide security for this operation. A token is an object used to authenticate credentials, typically based on a password which may be different from the user domain password. In these examples, if no token is provided or if the token is invalid 420 (e.g., expired or corrupted), the rule server 160 will indicate that authentication is required at operation 422. In this case, a plug-in login process 500 will be executed, as described in greater detail below in connection with FIG. 5.

At operation 430, the whitelist is provided by the rule server 160 to the background processing procedure 210. At operation 432, a message is sent from the background processing procedure 210 to the content processing procedure 220, to provide the whitelist and the sub-passwords (in encrypted form). At operation 600, the domain credential protection process is initiated, as will be described in greater detail below in connection with FIG. 6.

Figure 5:
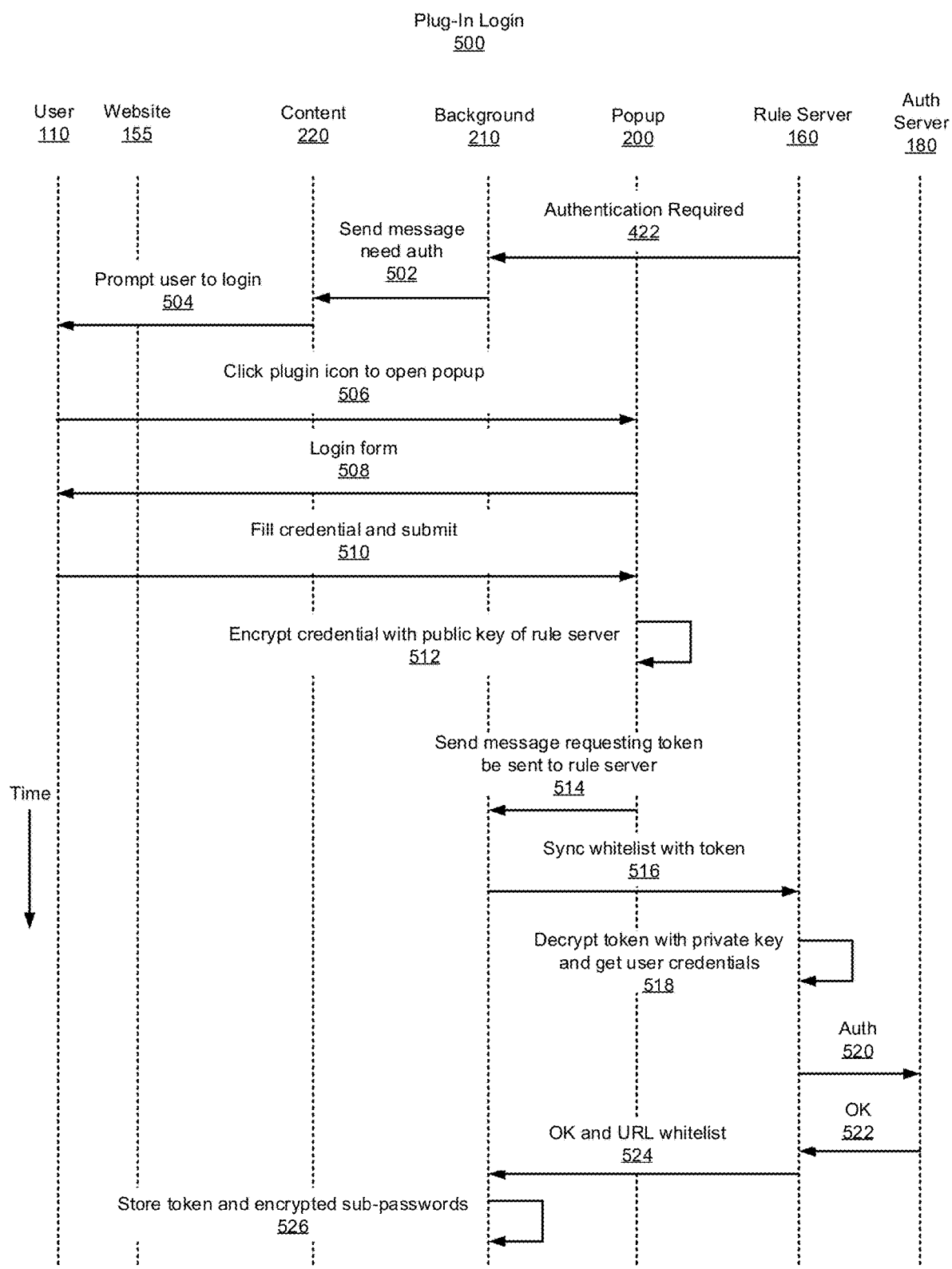
FIG. 5 is a sequence diagram of the browser plug-in login process, in accordance with an example of the present disclosure.

FIG. 5 is a sequence diagram of the browser plug-in login process 500, in accordance with an example of the present disclosure. The sequence diagram illustrates interactions between entities (user 110, website 155, content processing procedure 220, background processing procedure 210, pop-up processing procedure 200, rule server 160, and authentication server 180) in the horizontal direction, over time in the vertical direction.

As previously described, at operation 422, the rule server 160 indicates that authentication is required, either because a token was not offered or the token was invalid. At operation 502, the background processing procedure 210 sends a message to the content processing procedure 220, indicating that authentication is required. At operation 504, the content processing procedure 220 prompts the user 110 to login. At operation 506, the user clicks on a plug-in icon to open a pop-up window, and at operation 508, the pop-up processing procedure 200 presents the user with a login form. At operation 510, the user fills out the form by entering credentials and submits the form to the pop-up processing procedure 200, which operates in a context that is separate from the first context and thus prevents the website from obtaining the credentials entered by the user. At operation 512, the pop-up processing procedure 200 encrypts the credential with a public key of the rule server to generate a token.

At operation 514, the pop-up processing procedure 200 sends a message to the background processing procedure 210 requesting that the token be sent to the rule server 160 so that the whitelist and partial passwords can be obtained. At operation 516, the background processing procedure 210 provides the token to the rule server 160 with a request that the white list be synchronized and that the partial passwords be provided (e.g., in encrypted form).

At operation 518, the rule server 160 decrypts the token using a private key to obtain the user's credentials. At operation 520, the credentials are sent to an authentication server 1804 authentication, and that the credentials are valid, that operation 522 a confirmation is sent back to the rule server. Then, at operation 524, a confirmation, along with the whitelist and the encrypted partial passwords, are sent from the rule server 160 to the background processing procedure 210. At operation 526, the background processing procedure 210 stores. The validated token, whitelist, and list of partial passwords for future use.

Figure 6:
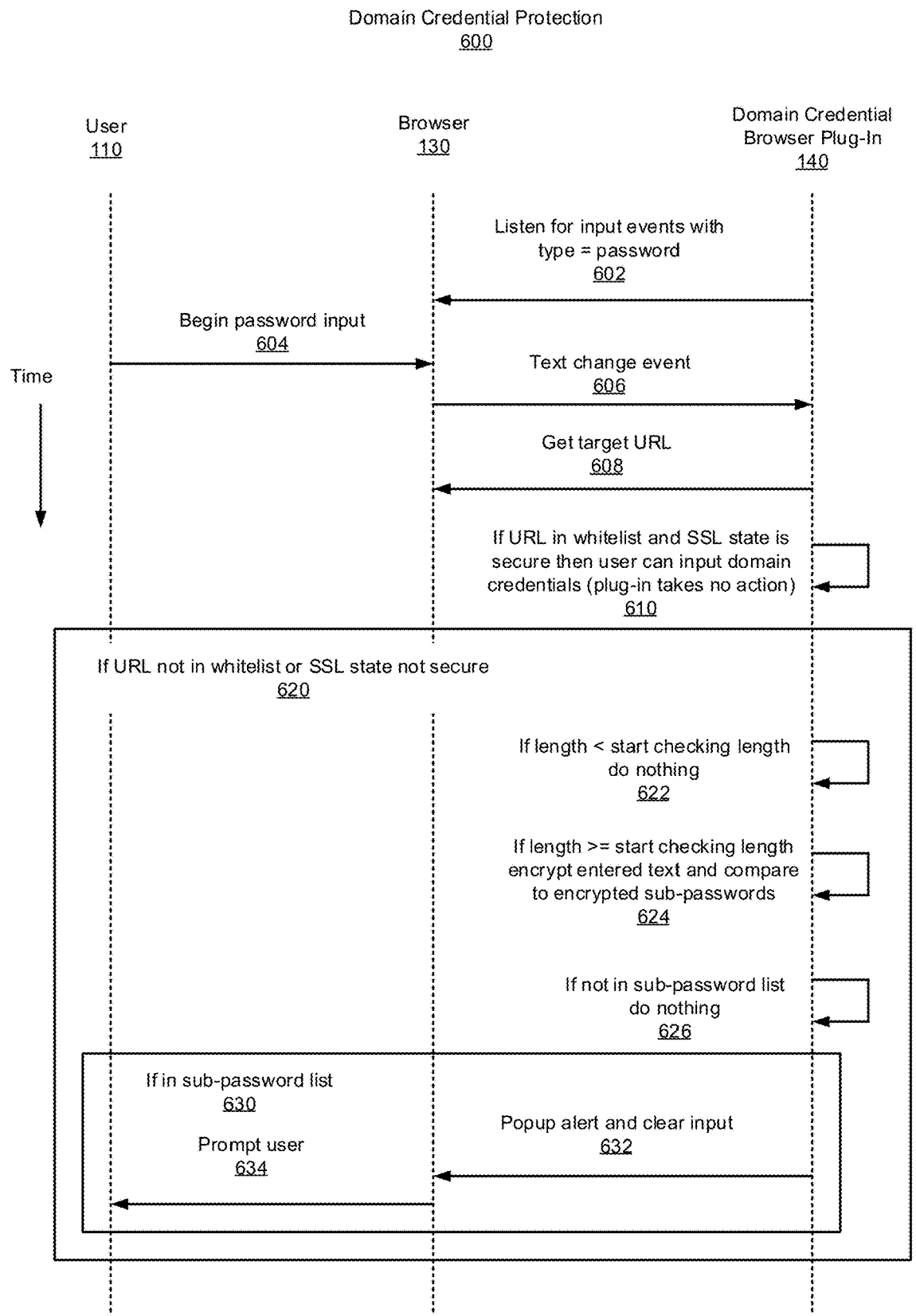
FIG. 6 is a sequence diagram of the domain credential protection process, in accordance with an example of the present disclosure.

FIG. 6 is a sequence diagram of the domain credential protection process 600, in accordance with an example of the present disclosure. The sequence diagram illustrates interactions between entities (user 110, browser 130, and domain credential browser plug-in 140) in the horizontal direction, over time in the vertical direction.

At operation 602, the plug-in 140 listens for input events to the browser 130 with type=password. At some future point in time, the user 110 begins to enter text characters into an input field presented by the browser 130, the text characters representing the beginning of a password input 604. This generates a text change event, at operation 606, which is detected by the plug-in 140. In some examples a text change event may include any changes to the input field including characters that are typed in, characters that are deleted, and/or cut and paste operations. At operation 608, the plug-in obtains the address of the website (e.g., the target URL) from the browser 130.

At operation 610, if the URL is included on the whitelist, and an encrypted internet communication protocol is being used (e.g., secure socket layer or SSL), then the user is allowed to input his/her domain credentials and the plug-in takes no action, otherwise the operations listed in box 620 are performed.

For example, at operation 622, the plug-in waits until the number of characters entered (e.g, the length of the text string) equals or exceeds the start-checking-length parameter. Once this occurs, then at operation 624, the entered text is encrypted and compared to the encrypted entries in the list of partial passwords. If there is no match, then at operation 626, the plug-in takes no action and the user is allowed to enter an additional character. If, however, there is a match to one of the partial passwords (box 630), then at operation 632, a pop-up alert is generated and the user input field is cleared, and at operation 634, the user is prompted for a new entry.

Figure 7:
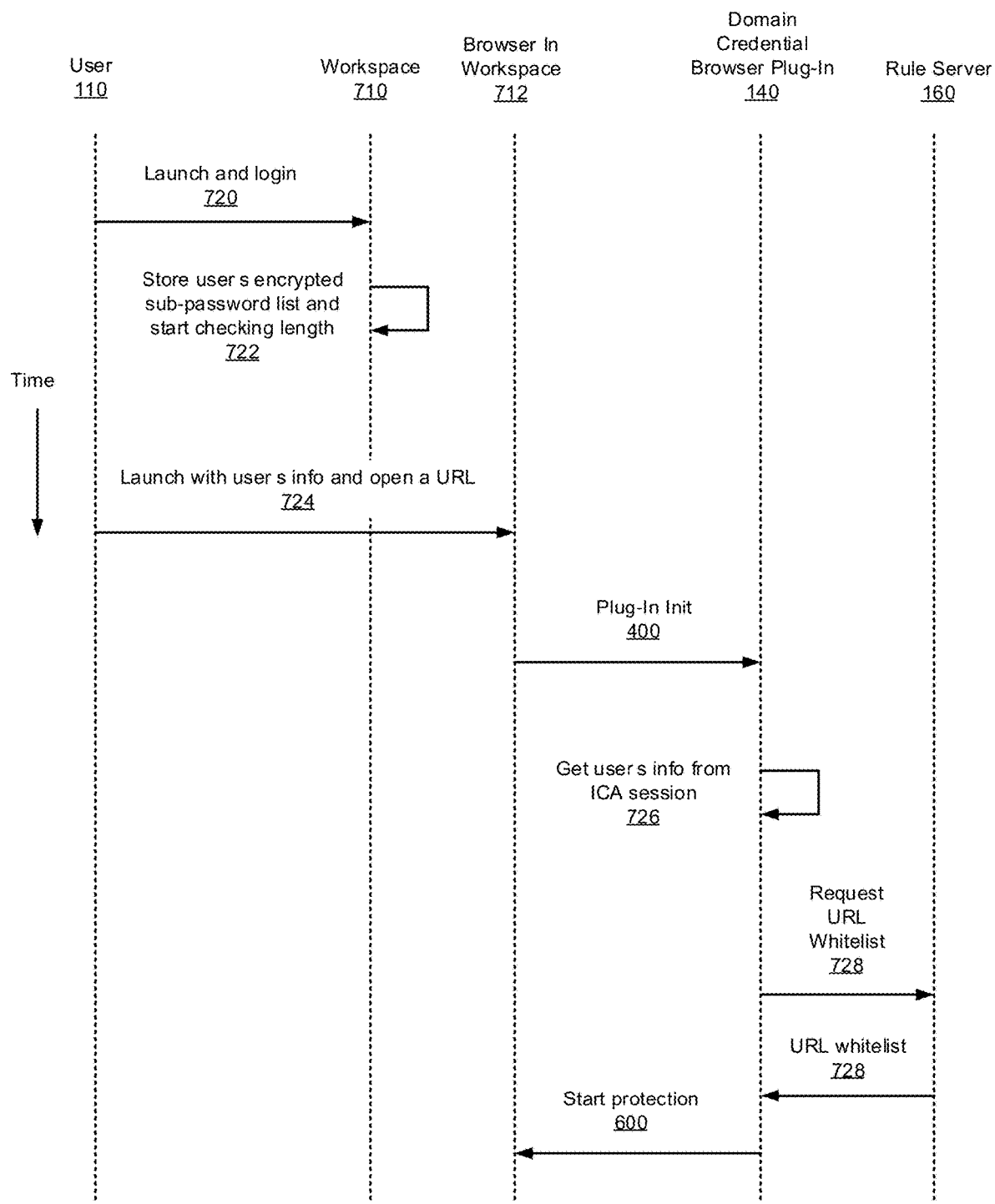
FIG. 7 is a sequence diagram of the domain credential protection process, in accordance with another example of the present disclosure.

FIG. 7 is a sequence diagram of the domain credential protection process 700 in a workspace environment, in accordance with another example of the present disclosure.

In this example, the web browser is executing in a workspace as opposed to the user's computer (e.g., a remote login or virtual application/desktop scenario), and the credential protection process is slightly modified. The sequence diagram illustrates interactions between entities (user 110, workspace 710, browser 712 in workspace, domain credential browser plug-in 140, and rule server 160) in the horizontal direction, over time in the vertical direction.

At operation 720, the user 110 launches and logs into a workspace 710. At operation 722, the workspace 710 stores the user's encrypted partial password list and the user's start-checking-length parameter. At operation 724, the user launches a web browser 712 in the workspace, with the user's information, and navigates to a website (e.g., opens a URL).

At operation 400, the browser 712 initializes the domain credential browser plug-in 140, as previously described. At operation 726, the plug-in 140 obtains the user's information from the Independent Computer Architecture (ICA) session (e.g., using PPAPI or Hypertext Transfer Protocol (HTTP)), including the encrypted partial password list and the start-checking-length parameter. At operation 728, the plug-in 140 requests the URL whitelist from the rule server 160. At operation 728, the rule server provides the whitelist to the plug-in, and the domain credential protection process 600 begins.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for User Intent Extraction

Figure 8:
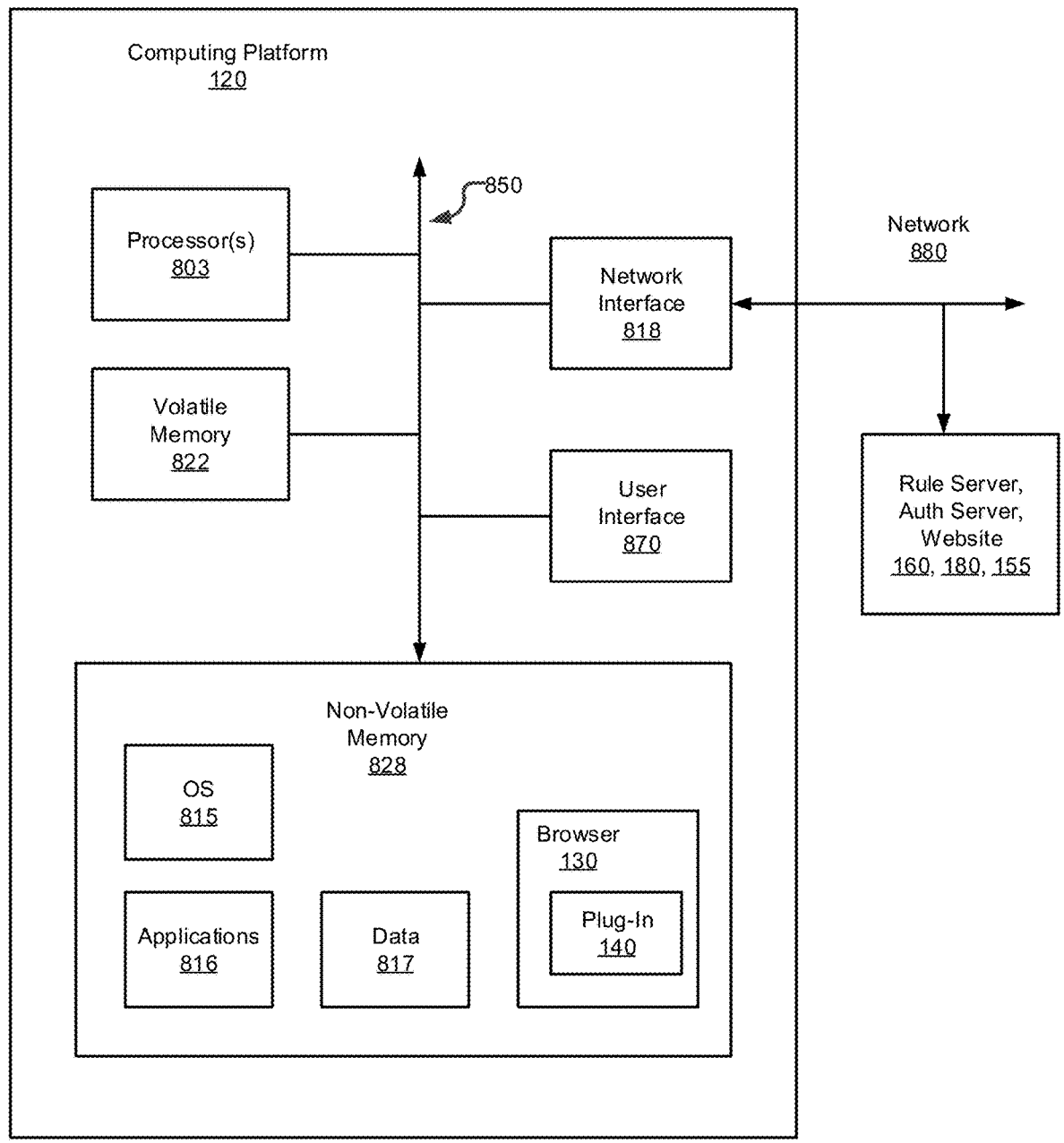
FIG. 8 is a block diagram of a computing platform configured to perform a process for domain credential protection, in accordance with an example of the present disclosure.

FIG. 8 is a block diagram of a computing platform configured to perform a process for domain credential protection, in accordance with an example of the present disclosure.

The computing platform or device 120 includes one or more processors 803, volatile memory 822 (e.g., random access memory (RAM)), non-volatile memory 828, user interface (UI) 870, one or more network or communication interfaces 818, and a communications bus 850. The computing platform 120 may also be referred to as a computer or a computer system.

The non-volatile (non-transitory) memory 828 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 870 can include a graphical user interface (GUI) (e.g., a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, etc.).

The non-volatile memory 828 stores an operating system (OS) 815, one or more applications 816, data 817, browser 130 (and plug-in 140) such that, for example, computer instructions of the operating system 815, application 816, and/or the browser 130 and plug-in 140 are executed by processor(s) 803 out of the volatile memory 822. In some examples, the volatile memory 822 can include one or more types of RAM and/or a cache memory that can offer a faster response time than a main memory. Data can be entered through the user interface 870 or received from the other I/O device(s). Various elements of the computer 120 can communicate via the communications bus 850.

The illustrated computing platform 120 is shown merely as an example client device or server and can be implemented by any computing or processing environment with any type of machine or set of machines that can have suitable hardware and/or software capable of operating as described herein.

The processor(s) 803 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 803 can be analog, digital or mixed. In some examples, the processor 803 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 818 can include one or more interfaces to enable the computing platform 120 to access a computer network 880 such as a Local Area Network (LAN), a Wide Area Network (WAN), a Personal Area Network (PAN), or the Internet (including web site 155) through a variety of wired and/or wireless connections, including cellular connections. In some examples, the network 880 may allow for communication with the rule server 160, the authentication server 180, and/or other computing platforms 890 to enable distributed computing.

In described examples, the computing platform 120 can execute an application on behalf of a user of a client device. For example, the computing platform 120 can execute one or more virtual machines managed by a hypervisor. Each virtual machine can provide an execution session within which applications execute on behalf of a user or a client device, such as a hosted desktop session. The computing platform 120 can also execute a terminal services session to provide a hosted desktop environment. The computing platform 120 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
   a memory; and
   at least one processor coupled to the memory and configured to:
   recognize a user input field of a web site displayable in a browser, the web site identified as a security risk based on a whitelist of web site addresses, wherein the web site is displayable in a first security context;
   determine that a sequence of characters within the user input field matches one or more entries in a list of partial passwords in response to the web site being identified as a security risk, wherein the list of partial passwords is an enumeration of all combinations of sub-strings of a user credential that excludes a number of characters, wherein the number of characters excluded from the enumeration of the all combinations of sub-strings of the user credential in the list of partial passwords is set to a difference between a length of the user credential and a threshold count of entered characters;
   obtain the user credential in a second security context, the second security context separate from the first security context such that the second security context prevents receipt of user input by the web site;
   authenticate the user credential with a rule server;
   obtain the whitelist of web site addresses from the rule server in response to the authentication;
   obtain the list of partial passwords from the rule server in response to the authentication, wherein the one or more entries in the list of partial passwords are encrypted;
   encrypt the sequence of characters;
   compare the encrypted sequence of characters to the one or more encrypted entries in the list of partial passwords to find a match; and
   prevent the user from entering additional characters into the user input field in response to the determination, to block receipt of the user credential by the web site.

2. The computer system of claim 1, wherein the at least one processor is further configured to perform the determination in response to a count of characters in the sequence of characters exceeding a threshold.

3. The computer system of claim 1, wherein the at least one processor is further configured to provide a warning to the user in response to the determination.

4. The computer system of claim 1, wherein the web site addresses are uniform resource locators.

5. The computer system of claim 1, wherein the partial password is a sub-string of the user credential that excludes one or more characters.

6. The computer system of claim 1, wherein the at least one processor is further configured to delete characters within the user input field in response to the determination.

7. A method of securing user credentials comprising:
recognizing, by a computer system, a user input field of a web site displayable in a web browser, the web site identified as a security risk based on a whitelist of web site addresses wherein the web site is displayable in a first security context;
determining, by the computer system, that a sequence of characters within the user input field matches one or more entries in a list of partial passwords in response to the web site being identified as a security risk, wherein the list of partial passwords is an enumeration of all combinations of sub-strings of a user credential that excludes a number of characters, wherein the number of characters excluded from the enumeration of the all combinations of sub-strings of the user credential in the list of partial passwords is set to a difference between a length of the user credential and a threshold count of entered characters;
obtaining, by the computer system, the user credential in a second security context, the second security context separate from the first security context such that the second security context prevents receipt of user input by the web site;
authenticating, by the computer system, the user credential with a rule server;
obtaining, by the computer system, the whitelist of web site addresses from the rule server in response to the authentication; and
obtaining, by the computer system, the list of partial passwords from the rule server in response to the authentication, wherein the one or more entries in the list of partial passwords are encrypted;
encrypting, by the computer system, the sequence of characters;
comparing, by the computer system, the encrypted sequence of characters to the one or more encrypted entries in the list of partial passwords to find a match; and
preventing, by the computer system, the user from entering additional characters into the user input field in response to the determination, to block receipt of the user credential by the web site.

8. The method of claim 7, wherein the determining is performed in response to a count of characters in the sequence of characters exceeding a threshold.

9. The method of claim 7, further comprising providing a warning to the user in response to the determination.

10. The method of claim 7, wherein the method is executed by a plug-in associated with the web browser.

11. The method of claim 7, wherein the web site addresses are uniform resource locators.

12. The method of claim 7, wherein the partial password is a sub-string of the user credential that excludes one or more characters.

13. A non-transitory computer readable medium storing executable sequences of instructions to secure user credentials, the sequences of instructions comprising instructions to:
recognize a user input field of a web site displayable in a web browser, the web site identified as a security risk based on a whitelist of web site addresses, wherein the web site is displayable in a first security context;
determine that a sequence of characters within the user input field matches one or more entries in a list of partial passwords in response to the web site being identified as a security risk, wherein the list of partial passwords is an enumeration of all combinations of sub-strings of a user credential that excludes a number of characters, wherein the number of characters excluded from the enumeration of the all combinations of sub-strings of the user credential in the list of partial passwords is set to a difference between a length of the user credential and a threshold count of entered characters;
obtain the user credential in a second security context, the second security context separate from the first security context such that the second security context prevents receipt of user input by the web site;
authenticate the user credential with a rule server;
obtain the whitelist of web site addresses from the rule server in response to the authentication;
obtain the list of partial passwords from the rule server in response to the authentication, wherein the one or more entries in the list of partial passwords are encrypted;
encrypt the sequence of characters;
compare the encrypted sequence of characters to the one or more encrypted entries in the list of partial passwords to find a match; and
prevent the user from entering additional characters into the user input field in response to the determination, to block receipt of the user credential by the web site.

14. The computer readable medium of claim 13, wherein the sequences of instructions further include instructions to perform the determination in response to a count of characters in the sequence of characters exceeding a threshold.

15. The computer readable medium of claim 13, wherein the sequences of instructions further include instructions to provide a warning to the user in response to the determination.

16. The computer readable medium of claim 13, wherein the sequences of instructions are included in a plug-in associated with the web browser.

17. The computer readable medium of claim 13, wherein the web site addresses are uniform resource locators.

18. The computer readable medium of claim 13, wherein the partial password is a sub-string of the user credential that excludes one or more characters.

19. The computer readable medium of claim 13, wherein the sequences of instructions further include instructions to delete characters within the user input field in response to the determination.

20. The computer system of claim 1, further comprising a virtual desktop and/or a virtual application, wherein the user credential comprises a password that provides access to the virtual desktop and/or virtual application.

21. The computer system of claim 1, wherein the authentication further comprises providing, by the at least one processor, a token to the rule server, wherein the token is based on a password which is different from the user credential.

* * * * *